J. W. CARHART.
VEHICLE TIRE.
APPLICATION FILED JULY 1, 1908.

959,457.

Patented May 31, 1910.

WITNESSES
J. A. Brophy
Wm. P. Patton

INVENTOR
John W. Carhart
BY
Munn & Co
ATTORNEYS

UNITED STATES PATENT OFFICE.

JOHN WESLEY CARHART, OF AUSTIN, TEXAS.

VEHICLE-TIRE.

959,457.

Specification of Letters Patent. Patented May 31, 1910.

Application filed July 1, 1908. Serial No. 441,270.

*To all whom it may concern:*

Be it known that I, JOHN W. CARHART, a citizen of the United States, and a resident of Austin, in the county of Travis and State of Texas, have invented new and useful Improvements in Vehicle-Tires, of which the following is a full, clear, and exact description.

The novel features of my invention are hereinafter fully described, and defined in the appended claim.

Reference is to be had to the accompanying drawings forming a part of this specification, in which similar characters of reference indicate corresponding parts in all the views.

Figure 1:
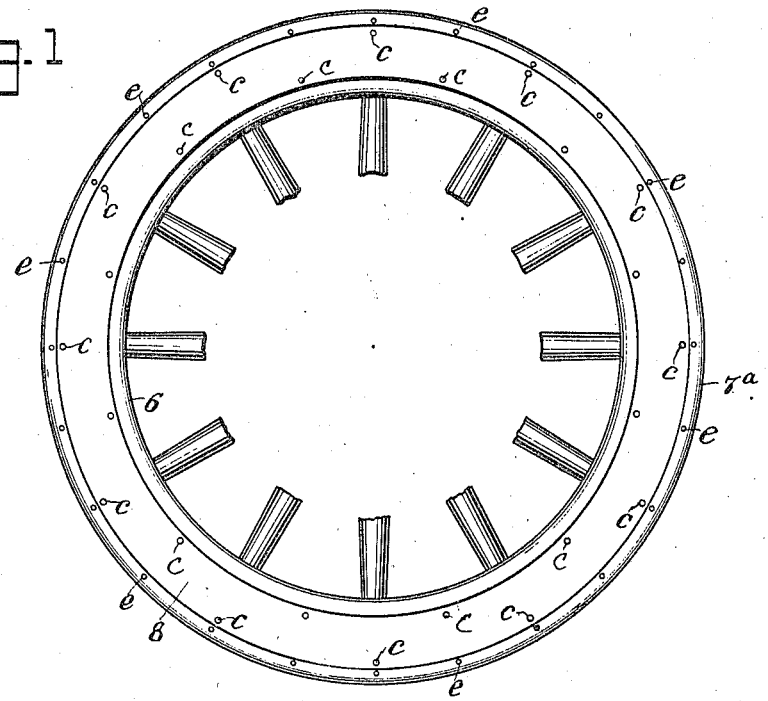
Figure 2:
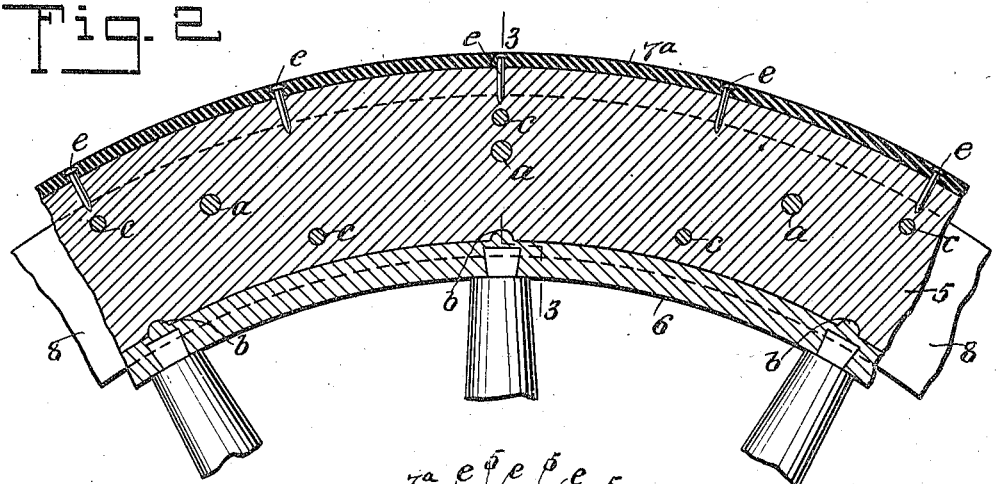
Figure 3:
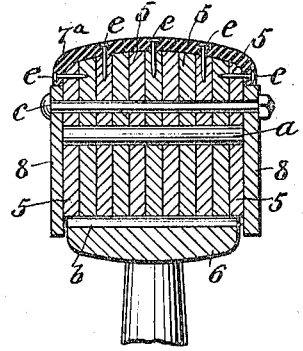

Figure 1 is a side view of the improved tire and of a wheel rim whereon the tire is mounted; Fig. 2 is an enlarged sectional side view of a portion of a wheel rim, and of the improved tire mounted thereon; Fig. 3 is a section on the line 3—3 of Fig. 2.

The laminæ constituting the body of the tire, are preferably formed of fiber board that is composed of a specially treated composition of matter, as is hereinafter fully described and claimed.

In manufacturing the tire, flat continuous rings 5 are cut from the specially-prepared fiber board, of such dimensions as will produce tires of a desired diameter, and said rings are assembled by arranging them side by side, until a proper width for the tire is afforded. The several layers or flat rings 5 of fiber board are preferably cemented together with coatings of glue dissolved in hot linseed oil, or other suitable material, placed between or upon the adjacent surfaces of the rings. Wooden dowel pins $a$ are inserted transversely through the laminæ in alined perforations formed therein at suitable intervals, and then the connected rings are subjected to sufficient lateral pressure for their consolidation into a practically solid tire.

The tire as constructed is placed in a lathe and turned to give it proper form and proportions; then it is subjected to an oil bath in an oven that is heated to a comparatively low temperature that will be subjected to change depending on the material composing the fiber board and bath applied thereto. The tires may also be rendered waterproof by introducing them within an airtight receptacle, then producing a vacuum therein by exhausting the air therefrom, after which a pore filler, that may be creosote, oil, liquefied gums or wax, is introduced and caused to permeate the opened pores of the material, by the introduction of air pressure created by pumping air into the receptacle. The tires thus treated are rendered perfectly waterproof and very durable.

The peripheral surface of the wheel rim 6, is provided at spaced intervals with integral transverse ribs $b$, and the diameter of the said wheel rim is slightly greater than the interior diameter of the tire, and the said tire is placed on the rim by pressing it on from one side, whereby when the tire is in place the ribs $b$ are embedded therein, the said ribs serving to prevent creeping movement of the tire on the rim.

The tire constructed as hereinbefore described, may be used without protection, but it is preferred to provide an exterior elastic or semi-elastic covering therefor which forms the tread of the tire.

As shown in Fig. 3, a plain strip of facing $7^a$ may be nailed on to the fiber board filler directly through the face of the tread with nails $e$ sufficiently close to hold the facing solidly to the body of the tire.

Clamping rings or ring plates 8 of metal are provided for engagement with the sides of the tire, and each ring is provided with two series of perforations, the perforations in one series being staggered with respect to the perforations of the other series.

Two rows of transverse perforations are formed in the tire body, that will respectively register with the perforations in the clamping rings 8 when the said rings are arranged on the opposite sides of the tire, and the rings are secured in place thereon by bolts $c$, which are inserted in and through the spaced perforations formed in the rings and the tire body. The tire body is also provided with another annular series of spaced perforations, through which extend dowel pins $a$, and the ends of the pins abut against the inner faces of the ring plates 8, when the said plates are in place, thus retaining the dowel pins in place, and preventing their dislodgment.

It will be noted that the envelop $7^a$ may be readily removed and replaced by a new one when worn out, and thus greatly increase the durability and time of effective service of the tire body.

While other material may be employed for the manufacture of the fiber boards 5, I prefer, on account of its superiority in the matter of durability and cheapness, to employ the following specified composition of matter, compounded as set forth: The material may be of a good quality of flax fiber board, leather fiber board, or paper board made from Mexican cactus fiber, in sheets or boards, waterproofed in vacuum by the use of a filler that may be oils of a suitable character, tar, gums, wax, creosote, or other liquefied substance having water-resisting properties, which will harden when exposed to the air, and which is applied by the method or process hereinbefore specified.

Having thus described my invention, I claim as new and desire to secure by Letters Patent:

A tire comprising a series of laminæ arranged side by side and provided with transverse registering openings for the reception of dowel pins passing through the openings, a ring plate arranged on each side of the tire and against whose inward face the adjacent ends of the dowel pins abut, bolts traversing the ring plates for securing them in place, and an elastic envelop on the outer face of the tire and lapped on the side thereof, the edges of the envelop abutting the edges of the ring plates, and nails driven through the envelop into the laminated body of the tire.

In testimony whereof I have signed my name to this specification in the presence of two subscribing witnesses.

JOHN WESLEY CARHART.

Witnesses:
   Wm. James Rosenberg, Jr.,
   J. D. Simms.